2,459,537

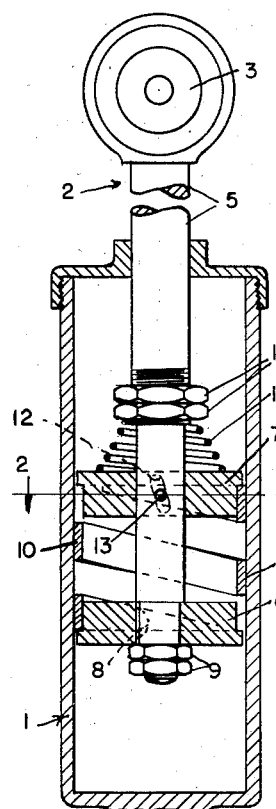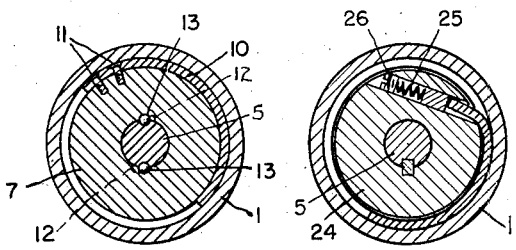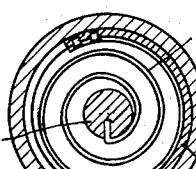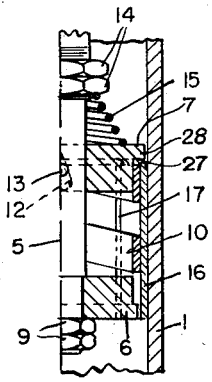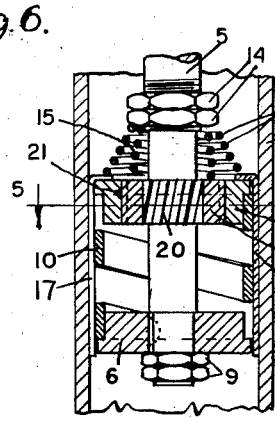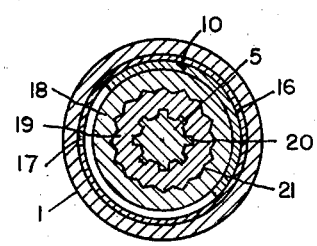
INVENTOR.
PETER B. OBERSTADT
BY
Oberlin & Limbach
ATTORNEYS Patented Jan. 18, 1949

UNITED STATES PATENT OFFICE 2,459,537

DAMPENING DEVICES FOR SHOCK ABSORBERS AND THE LIKE

Peter B. Oberstadt, Wickliffe, Ohio

Application May 27, 1946, Serial No. 672,550

11 Claims. (Cl. 188—129)

The present invention relates to improvements in a device for dampening or cushioning the movement or movements of relatively movable parts, such device being commonly termed a "shock absorber" when used for example for dampening the movements between the sprung mass and the unsprung mass of a vehicle.

It is one object of this invention to provide a dampening device which is simple in structure and efficient in operation.

It is another object of this invention to provide a dampening device which offers greater resistance and thus greater dampening effect to movement of the parts with which it is associated in one direction of their relative movement than in the other direction.

Another object is to provide a dampening device in the general form of a piston and cylinder type hydraulic shock absorber but without the attendant problems of providing leak proof packings, gaskets or the like.

Another object is to provide a dampening device wherein the dampening effect can readily be adjusted over a wide range to suit particular applications.

Additional objects and advantages of the invention will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In the drawing:

Fig. 1 is a longitudinal central cross section view of one form of dampening device showing such device in a static or neutral position;

Fig. 2 is a transverse cross section view of the device illustrated in Fig. 1 taken along line 2—2 of Fig. 1;

Fig. 3 is a fragmentary longitudinal central cross section view of a modified form of dampening device;

Fig. 4 is a fragmentary longitudinal central cross section view of still another modified form of dampening device;

Fig. 5 is a transverse cross section view of the modified form of device illustrated in Fig. 4 taken along line 5—5 of Fig. 4;

Fig. 6 is a fragmentary longitudinal cross section view of still another modified form of dampening device;

Fig. 7 is a transverse cross section view of the device illustrated in Fig. 6 taken along line 7—7 of Fig. 6; and Fig. 8 is a transverse cross section view of still another form of dampening device taken along a line corresponding to line 2—2 of Fig. 1.

Referring now to the drawing and first to Figs. 1 and 2, there is shown therein relatively movable telescoped elements 1 and 2, each of which may be provided with an eye 3 for connection to the parts whose movement it is desired to dampen, as for example the unsprung mass (the axle) and the sprung mass (the frame) of a vehicle. Element 1 is preferably in the form of a tube or hollow cylinder within which the element 2 is reciprocably mounted. Element 2 comprises a piston portion 4 and a rod portion 5 and obviously, if any dampening action is to be attained, there must be resistance to relative movement of the elements 1 and 2 and preferably such resistance should vary in accordance with the direction and the extent of relative movement of said elements.

One manner of achieving such aforesaid resistance and variable resistance to relative movement of the elements 1 and 2 is to make the piston portion 4 of such form that it will expand and contract to vary the friction between it and the element 1 in response to opposite relative movements thereof. In the embodiment of the invention illustrated in Figs. 1 and 2, the piston portion of the element 2 comprises spaced heads 6 and 7, the former of which is immovably connected to the rod 5 in any suitable manner as by a key 8 disposed in key-ways in the head and in the rod and lock nuts 9 in threaded engagement with the end of the rod and the latter of which is movably connected to the rod 5 in such a manner that it will simultaneously rotate and move longitudinally therealong. Such latter connection will be presently described in detail.

Disposed between the heads 6 and 7 is a helical member 10 having its opposite ends fastened as by screws 11, Fig. 2, to the respective heads. Said member 10 is preferably in the form of a coil spring wound from rectangular cross section wire and is of diameter such that it will snugly fit into the element 1.

The aforesaid movable connection between the head 7 and rod 5 comprises a pair of slots 12 in head 7 in each of which a ball 13 is movable. Each ball 13 is fitted into a recess in the rod and projects therefrom into the slot 12. Slots 12 are inclined relative to the axis of the rod and therefore any longitudinal movement of the head 7 relative to the rod 5 and head 6 will simultaneously effect rotation thereof relative to said rod and said head.

Threaded on to rod 5 are lock nuts 14 against which one end of a spring 15 bears. The other end of the spring 15 bears against head 7 and thus normally tends to urge the head 7 toward head 6. Thus, when the piston portion 4 is inserted into the element 1, the spring 15 will be operative to move the head 7 downwardly, as viewed in Fig. 1, and to rotate the same clockwise as viewed in Fig. 2, both of which movements will increase the diameter of the helical member 10 and thereby force the outer surface thereof into engagement with the inner wall of element 1. As is well known a helical member increases in diameter when axially compressed. To provide a still further increase in diameter the ends of a helical member may be rotated relative to one another to uncoil or unwind the same. In certain forms of my invention I utilize both of these expedients to accomplish variation in the diameter of helical member 10 and thus a variation in the contact pressure between member 10 and the inner wall of element 1.

The contact pressure between member 10 and element 1 can readily be varied simply by adjusting the nuts 14 along the rod 5 or by substituting a weaker or stronger spring 15 or by substituting a new head 7 having slots 12 therein inclined more or less than shown. In order that the contact pressure so effected will result in a substantial friction to effectively resist relative movement of the elements 1 and 2, helical member 10 is preferably coated with a powdered metal which has a suitable coefficient of friction with the metal from which element 1 is made.

With the elements 1 and 2 in a static position, as illustrated in Fig. 1, the helical member 10 will be in frictional engagement with the inner wall of the element 1. Now, if the vehicle parts or other parts with which the dampening device is associated are moved toward one another, such movement through the aforesaid frictional contact will effect relative movement of head 6 away from head 7 and because rod 5 is fixed against rotation, the head 7 will, by reason of the slot and ball connection, be caused to rotate in a counter-clockwise direction as viewed in Fig. 2, thereby in effect winding up the helical member 10. Both the longitudinal movement and the relative rotation of the heads 6 and 7 will effect a reduction in the diameter of member 10 away from the inner wall of the element 1. Such reduction in diameter will effect a reduction in the resistance to relative movement of the elements 1 and 2. In this way the resistance to movement of the elements 1 and 2 toward one another will decrease as such relative movement continues.

As soon as the vehicle parts or other parts commence movement away from one another, the friction of member 10 with element 1 will cause relative movement of the heads 6 and 7 toward one another, thereby compressing member 10 and at the same time effecting rotation of head 7 in a clockwise direction, as viewed in Fig. 2, thereby unwinding or uncoiling the member 10. Both of such actions forces the helical member 10 into progressively firmer contact with element 1 as such relative movement continues. Such gradual increase in resistance to relative movement of elements 1 and 2 effectively dampens the relative movement of the parts with which the dampening device is associated. Thus, if the device is connected to the axle and frame of an automobile, the wheels thereof can relatively freely pass over any irregularities in the road without lifting the frame along with it, but on the return movement of the wheels such dampening is of greater effect and quickly stops any tendency of the frame to continue to bounce up and down a number of times as would be the case if no dampening device were employed.

The device illustrated in Fig. 3 is substantially the same as that of Figs. 1 and 2 and insofar as they are the same, like reference numerals have been used to designate like parts. The only difference between Figs. 1 and 3 is that in Fig. 3 there is provided a friction sleeve 16 around the helical member 10. Said sleeve is slit longitudinally thereof as at 17, so as to render the same readily expansible and contractible in response to expansion and contraction of the helical member 10. Said sleeve can be made from friction material such as brake lining or it can be made of metal coated with a powdered material or provided with any suitable friction material coating. In order to hold said sleeve in proper position longitudinally of the head 7, one end thereof is provided with an inturned flange 27 which is fitted into a space between the end of helical member 10 and a flange portion 28 of the head 7. Inasmuch as the operation of this modified form is the same as that of Fig. 1, such will not now be repeated except to indicate that the sleeve 16 is of resilient construction and normally tends to collapse in diameter so that it is not necessary to fasten the same to member 10.

The form of invention illustrated in Figs. 4 and 5 includes a two-part upper head structure in place of the head 7 shown in Fig. 1; that is, an outer section 18 to which one end of member 10 is secured, and an inner section 19 which is longitudinally slidable relative to rod 5 and to outer section 18. Said inner section 19 is connected to rod 5 through a spiral gear which is arranged so that said section will, when moved longitudinally of rod 5, simultaneously rotate. There is provided a longitudinally slidable serrated connection 21 between said sections These serrations may be parallel to the axis of rod 5 so that rotation of the outer section 18 will be the same as that of inner section 19, or if desired, such serrations may be inclined in the same or in an opposite direction from the inclination of the gear teeth whereby the total rotation of the outer section will be the sum of or the difference of the rotations of each section.

The spring 15 which bears against the inner section 19 tends to force said section downwardly and clockwise, as viewed in Figs. 4 and 5 respectively, thereby effecting rotation of outer section 18 in a clockwise direction, as viewed in Fig. 5. Such rotation of the outer section 18 is effective to unwind member 10 and thus expand sleeve 16 into frictional engagement with element 1. In this modified form a spring 22 which bears against an inturned collar portion of sleeve 16 holds the sleeve in proper longitudinal relation to the outer section 18. As in the previously described forms, the form illustrated in Figs. 4 and 5 employs a spring 15 which, through a movable head, normally holds the sleeve 16 in a frictional engagement with element 1 and in which opposite relative movements of elements 1 and 2 effect an increase or a decrease in the resistance to movement of said elements.

From the drawing it will be evident that the dampening action can be varied in many ways, as for example, by changing the pitch and/or the wire size and shape of wire cross section of member 10, by changing the pitch or inclination of the slots or gear teeth, by varying the compression of spring 15 or by varying the coefficient of friction between the elements by substituting different metals therefor. Furthermore, it is contemplated that the heads might be reversed; that is, the lower head 6 may be made movable relative to the rod and the upper head 7 made immovable relative to the rod. Likewise, the dampening action can obviously be reversed from that shown, as for example by simply reversing the inclination of the slots or gear teeth. Also it may be desirable in certain instances to mount both heads so as to be movable on the rod, in which case the rotation of each may be in the same direction or in opposite directions as desired.

One desirable feature of my invention is that the ends of the helical member 10 be rotated relative to one another and while I have shown in all forms of my invention a spring pressing longitudinally against a head engaged in a threadlike manner with a rod, such manner of accomplishing relative rotation is to be considered as merely typical. Also, while my invention may have particular utility as a shock absorber in automobiles or other vehicles, it can be used with little or no modification as a door check or the like.

Typical examples of ways other than those shown in Figs. 1–5 inclusive of accomplishing unwinding of member 10 to attain the desired initial static friction condition between member 10 and element 1 or between sleeve 16 and element 1 are shown in Figs. 6 and 7 and in Fig. 8. In the form of Figs. 6 and 7, one end of member 10 is connected to one end of a spiral spring 23 and the other end of spring 23 is connected to the rod 5 in such manner that the uncoiling tendency of spring 23 tends to uncoil or unwind helical member 10 to thus urge the latter into frictional engagement with element 1. The lower end of rod 5 may, of course, be fitted with a head as shown in Fig. 1. With an initial static friction so effected, it will be evident that opposite relative movements of elements 1 and 2 will effect axial lengthening or shortening of member 10 to thereby decrease or increase respectively the diameter thereof and thus vary the snubbing action between elements 1 and 2 as previously described.

In the form of invention illustrated in Fig. 8, the upper end of member 10 is fitted into one end of a transverse recess through a head 24 non-rotatably connected to rod 5. Within such recess is a spring 25 and an adjustable plug 26 threaded thereinto from its other end to urge spring 25 into engagement with the end of member 10 and thereby tend to expel the same from the recess. The effect of such force exerted by spring 25 on member 10 is to tend to unwind the same into firm engagement with element 1. The lower end of member 10 is, of course, connected to a head 6, as shown in Fig. 1. It is to be noted that head 24 may or may not be fixed longitudinally of rod 5, as desired. If it is so fixed, then the relative movement of eyes 3 away from one another effects crowding of the coils of member 10 toward head 6 to increase the resistance to such relative movement. On the other hand, movement of eyes 3 toward one another effects a crowding of the coils of member 10 toward head 24 to increase the resistance to such relative movement. Thus, with such an arrangement, equal dampening occurs in both directions of relative movement of elements 1 and 2. If head 24 is mounted so as to be movable longitudinally of rod 5, then the action of the shock absorber is the same as that of Fig. 1 to produce a greater dampening effect in one direction than in the other direction.

It is to be understood, of course, that while for illustrative purposes I have shown my device in conjunction with a shock absorber of the direct acting type, it may be used with equal facility in a shock absorber of the link and lever type or in other similar types of shock absorbers. In any event, the ultimate result which is desired is the dampening of movements of relatively movable elements.

Other modes of applying the principle of the invention may be employed, change being made as regards the details described, provided the features stated in any of the following claims or the equivalent of such be employed.

I therefore particularly point out and distinctly claim as my invention:

1. A shock absorber element comprising a rod, spaced heads on said rod rotatable relative to one another, a member connected to said heads expandible in response to relative rotation of said heads in one direction, and means normally tending to rotate said heads relative to one another in said direction.

2. A shock absorber element comprising a rod, spaced heads on said rod rotatable relative to one another, a member connected to said heads expandible in response to relative rotation of said heads in one direction, and means normally tending to rotate said heads relative to one another in said direction, said means including a spring bearing on one of said heads and on said rod.

3. A shock absorber element comprising a rod, spaced heads on said rod rotatable relative to one another, and a member connected to said heads expandible in response to relative rotation of said heads in one direction, one of said heads and said rod including interengaged portions comprising a slot inclined relative to the axis of said rod and a projection movable in such slot.

4. A shock absorber element comprising a rod, spaced heads on said rod rotatable relative to one another, and a member connected to said heads expandible in response to relative rotation of said heads in one direction, one of said heads and said rod including interengaged portions comprising a slot in said head inclined relative to the axis of said rod and a ball carried by said rod movable in such slot.

5. A shock absorber element comprising a rod, spaced heads on said rod rotatable relative to one another, and an expandible member connected to said heads, said member being expandible in response to rotation of said heads relative to one another in one direction, one of said heads comprising inner and outer sections connected to one another, to said rod, and to said member in such manner that longitudinal movement of one of said sections relative to said rod is translated into rotation of that section which is connected to said member.

6. A shock absorber element comprising a rod, spaced heads on said rod rotatable relative to one another, an expandible member connected to said heads, said member being expandible in response to rotation of said heads relative to one another in one direction, one of said heads comprising inner and outer sections connected to one another, to said rod, and to said member in such manner that longitudinal movement of one of said sections relative to said rod is translated into rotation of that section which is connected to said member, and spring means bearing against said rod and one of said sections normally tending to effect such rotation.

7. In a shock absorber or the like, the combination of frictionally engaged elements reciprocable relative to one another, one of said elements comprising a helical member, and means associated with said member operable to wind and unwind said member in response to opposite reciprocatory movements of said elements to thus vary the friction between said elements.

8. In a shock absorber or the like, the combination of a cylinder, a helical member in said cylinder in frictional engagement therewith, said cylinder and member being reciprocable relative to one another, and means connected to said member operable to wind and unwind the same in response to opposite reciprocatory movements of said cylinder and member to thus vary the friction between them.

9. A shock absorber element comprising a rod, relatively movable spaced heads on said rod, a helical member having its opposite ends connected to said heads, and means associated with at least one of said heads operable to wind and unwind said member in response to movement of said heads relative to one another in opposite directions.

10. A shock absorber element comprising a rod, relatively movable spaced heads on said rod, a helical member having its opposite ends connected to said heads, and means on said rod associated with at least one of said heads operable in response to movement of said heads relative to one another in opposite directions to effect rotation of said heads relative to one another in opposite directions, such relative rotation of said heads being effective to wind and unwind said helical member.

11. In a shock absorber or the like, the combination of a cylinder, a piston reciprocable in said cylinder and in frictional engagement therewith, said piston comprising a rod having a fixed head and a movable head thereon with a helical member connected to said heads, and means associated with said rod and the movable head thereon for rotating said movable head in opposite directions in response to opposite reciprocatory movements of said cylinder and piston to thus expand and contract said helical member to vary such friction between said piston and cylinder.

PETER B. OBERSTADT.

REFERENCES CITED

The following references are of record in the file of this patent:

UNITED STATES PATENTS

| Number | Name | Date |
| --- | --- | --- |
| 2,136,908 | Pierce | Nov. 18, 1938 |
| 2,212,759 | Tea | Aug. 27, 1940 |